(12) United States Patent
Bentkovski

(10) Patent No.: US 10,647,484 B2
(45) Date of Patent: May 12, 2020

(54) DEVICE FOR REMINDING AND MEASURING MATERIAL LEVEL INSIDE A MATERIAL CONTAINER

(71) Applicant: WaterIO Ltd, Ness Ziona (IL)

(72) Inventor: Yakov Bentkovski, Ness Ziona (IL)

(73) Assignee: WaterIO Ltd., Ness Ziona (IL)

( * ) Notice: Subject to any disclaimer, the term of this patent is extended or adjusted under 35 U.S.C. 154(b) by 0 days.

(21) Appl. No.: 14/972,870

(22) Filed: Dec. 17, 2015

(65) Prior Publication Data

US 2016/0180690 A1 Jun. 23, 2016

Related U.S. Application Data

(60) Provisional application No. 62/093,411, filed on Dec. 18, 2014.

(51) Int. Cl.
| | | |
|---|---|---|
| *B65D 51/24* | (2006.01) | |
| *G01F 23/26* | (2006.01) | |
| *G01F 23/296* | (2006.01) | |
| *G01F 23/292* | (2006.01) | |

(52) U.S. Cl.
CPC ............ *B65D 51/248* (2013.01); *G01F 23/26* (2013.01); *G01F 23/292* (2013.01); *G01F 23/296* (2013.01)

(58) Field of Classification Search
CPC .. B65D 51/245; B65D 51/248; B65D 41/048; G08B 21/20; G01F 23/00; G01F 23/26; G01F 23/292
USPC ........................................................ 340/604
See application file for complete search history.

(56) References Cited

U.S. PATENT DOCUMENTS

| | | | | |
|---|---|---|---|---|
| 7,017,807 B2 * | 3/2006 | Kipp | ...................... | B65D 51/24 235/385 |
| 8,091,579 B2 | 1/2012 | Sintes et al. | | |
| D718,626 S * | 12/2014 | Lane | ...................... | B65D 41/62 D9/449 |
| 9,151,605 B1 | 10/2015 | Sweeney et al. | | |
| 2007/0222619 A1 * | 9/2007 | Moran | .................... | G01F 1/075 340/573.1 |

(Continued)

FOREIGN PATENT DOCUMENTS

| | | |
|---|---|---|
| CN | 203461375 | 3/2014 |
| WO | WO 2015/187545 | 12/2015 |

*Primary Examiner* — Hirdepal Singh
(74) *Attorney, Agent, or Firm* — Pearl Cohen Zedek Latzer Baratz LLP

(57) ABSTRACT

Disclosed is a device to measure the material level inside the container. The device includes a printed circuit board attached to the top of the cap of the container; a first sensor placed in between the printed circuit board and the cap for measuring the material level inside the container, further the first sensor generates sensing signal based on the material level; a battery placed on the printed circuit board; a battery holder for holding the battery on the printed circuit board; a controller connected to the printed circuit board for releasing reminding signals based on the analysis of the sensed signals, further the controller wirelessly communicates with the computing device; an output unit connected to the printed circuit board for releasing output signals on receiving reminding signals from the controller; and a housing unit connected to the cap of the container for housing the printed circuit board, the first sensor, the battery, the battery holder, the controller, and the output unit.

10 Claims, 4 Drawing Sheets

(56) References Cited

U.S. PATENT DOCUMENTS

| | | | | |
|---|---|---|---|---|
| 2014/0251850 | A1* | 9/2014 | Huang | A61J 1/03 |
| | | | | 206/459.1 |
| 2014/0319170 | A1* | 10/2014 | Sweeney | A47G 19/2272 |
| | | | | 220/714 |
| 2015/0257981 | A1* | 9/2015 | Arad | A61J 7/0481 |
| | | | | 340/573.1 |
| 2016/0025545 | A1* | 1/2016 | Saltzgiver | G01F 23/263 |
| | | | | 73/304 C |
| 2016/0048657 | A1* | 2/2016 | LeBrun | G06F 19/3462 |
| | | | | 705/2 |
| 2016/0120758 | A1* | 5/2016 | Pi | A61J 1/03 |
| | | | | 340/870.07 |
| 2016/0198246 | A1* | 7/2016 | Gurumohan | H04Q 9/00 |
| | | | | 340/870.02 |
| 2016/0297583 | A1* | 10/2016 | Staeben | F21V 33/004 |
| 2016/0327427 | A1* | 11/2016 | Briones | A61J 7/02 |

\* cited by examiner

DEVICE FOR REMINDING AND MEASURING MATERIAL LEVEL INSIDE A MATERIAL CONTAINER

CROSS REFERENCE TO RELATED APPLICATION

This non-provisional application takes priority from U.S. Provisional Application No. 62/093,411 filed on Dec. 18, 2014 and incorporates the entirety of same by reference herein.

BACKGROUND OF THE INVENTION

1. Field of the Invention

The present invention generally relates to a measurement and reminder communication system attached with a material container, and more specifically relates to a measurement and reminder communication system attached with a material container to communicate data to a computing device of a user through a communication network.

2. Description of Related Art

Water or fluid is crucial to the human being. Every system in the body depends on water or fluid. The human body made up of between 55 and 75 percent water, is in need of timely water replenishment. Lack of water can lead to dehydration, a condition that occurs when someone does not have enough water in his/her body to carry on normal functions. Even mild dehydration—as little as a 1 percent to 2 percent loss of the body weight—can exhaust the energy and make the person tired.

Dehydration poses a particular health risk for the very young and the very old. Signs and symptoms of dehydration includes but not limited to excessive thirst, fatigue, headache, dry mouth, little or no urination, muscle weakness, dizziness etc. People seem to carry bottled water everywhere they go. Health practitioners all over the world suggest drinking of eight glasses water a day.

There are plenty of other reasons to drink water. The major reasons for drinking water includes maintaining the balance of body materials, controlling calories, energizing muscles, maintaining skin quality, and helping kidneys. People of different ages, gender and weight may require drinking different amount of water per day according to various factors such as locale profile, country and climate profile.

Various apparatus are known for containing various materials such as liquid, powder, tablets etc. Such apparatus generally uses scale marks method to measure the material level. However, such methods are time consuming and do not accurately measures the material level. Further, such apparatus fails to provide reminding signals based on the material consumption.

Therefore, there is a need of a device for reminding and measuring material level inside a material container using sensors. Further, the device communicates the material used by a user to a computing device.

SUMMARY OF THE INVENTION

In accordance with teachings of the present invention, an in-cap device attached to a neck of a container for measuring material level is provided.

An object of the present invention is to provide the in-cap device with a cap comprising an indent configured to receive the neck of the container, wherein the indent aligned parallel to the neck; a printed circuit board attached to the cap of the container; a first sensor placed in between the printed circuit board and the indent of the cap, the first sensor measuring the material level inside the container through the neck, and further the first sensor generates sensing signal based on the measurement of material level; and a battery placed on the printed circuit board.

Further, the in-cap device includes a battery holder for holding the battery on the printed circuit board, and a controller connected to the printed circuit board for releasing reminding signals based on the analysis of the sensed signals. The controller wirelessly communicates with the computing device.

Further, the in-cap device includes an output unit for generating output signals upon receiving reminding signals from the controller, a wireless communication unit for wirelessly communicating with the computing device and a housing unit connected to the cap of the container for housing the components of the in-cap device.

Another object of the in-cap device is to provide the first sensor includes at least one of: an optical sensor; capacitive sensor; and ultrasonic sensor. The output unit includes at least one of an audio unit connected to the printed circuit board to generate audio signals on receiving reminder signals from the controller, one or more light emitting sources connected to the printed circuit board to illuminate on receiving reminder signals from the controller, and a vibration unit connected to the printed circuit board to produce vibration signals on receiving reminder signals from the controller.

Another object of the present invention is to provide the in-cap device wherein the wireless communication unit includes at least one of a wireless transceiver and a wireless transmitter. Another object of the present invention is to provide a second sensor to detect detaching and attaching of the cap from the container, further the second sensor releases sensing signal for the controller.

An object of the present invention is to provide a clip-on device clipped on to a cap of a container for measuring material level and communicating with a computing device. The clip-on device includes a bottom cover includes an indent placed on the cap of the container, wherein the indent is aligned parallel to the neck of the container.

Another object of the present invention is to provide the clip-on device with a printed circuit board placed on the bottom cover, and a first sensor placed in between the printed circuit board and the bottom cover, further the first sensor configured in the indent of the bottom cover, further the first sensor measures the material level inside the container and generates sensing signal based on the material level.

Another object of the present invention is to provide the clip-on device with a battery placed on the printed circuit board, a battery holder for holding the battery on the printed circuit board, and a controller connected to the printed circuit board for generating reminding signals based on the analysis of the sensing signals, further the controller wirelessly communicates with the computing device.

Another object of the present invention is to provide the clip-on device with an output unit for generating output signals on receiving reminding signals from the container; a wireless communication unit for wirelessly communicating with the computing device; and a cap detachably mounted on the container for housing the bottom cover, the printed circuit board, the first sensor, the battery, the battery holder, the controller, the output unit and the wireless communication unit.

Figure 1:
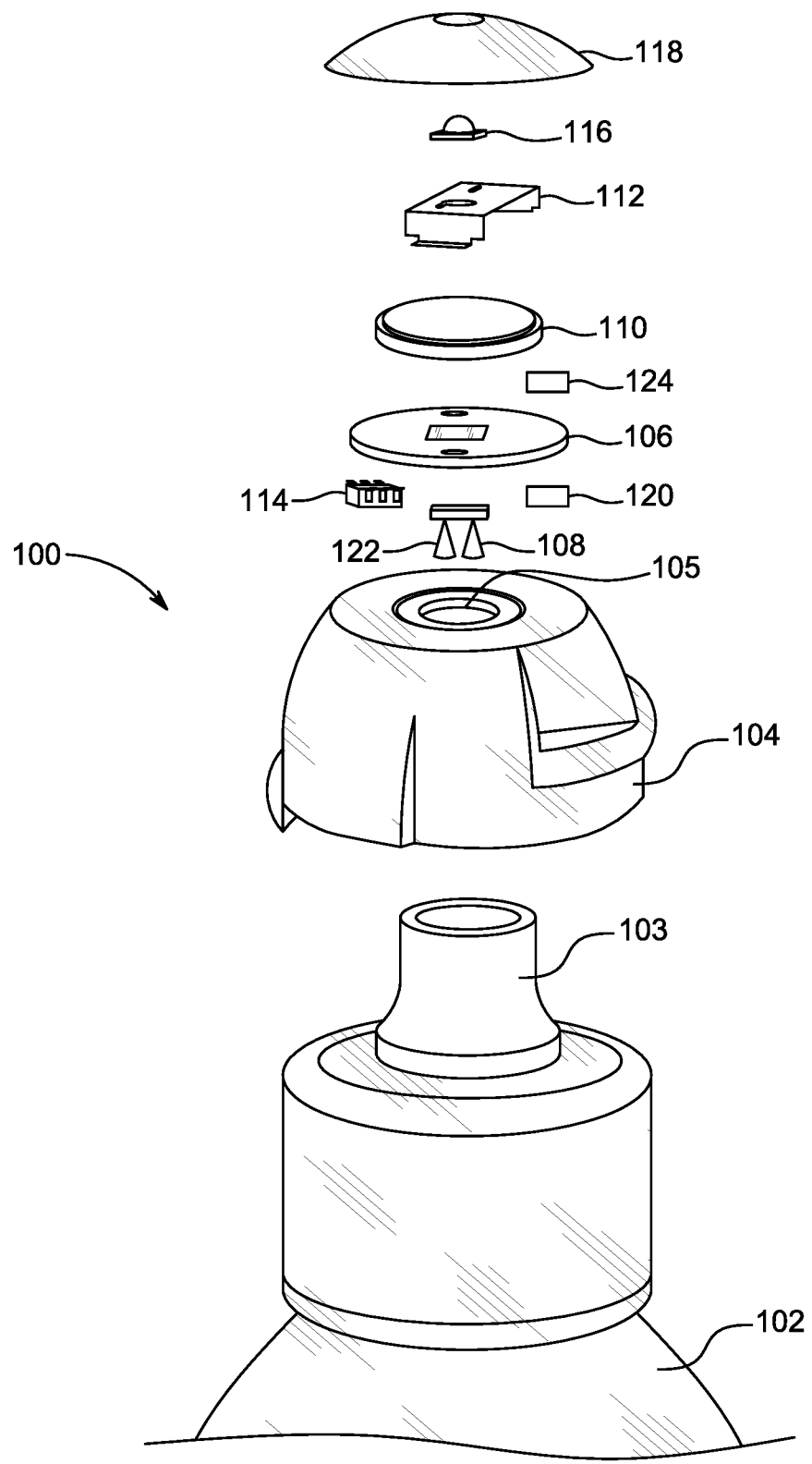
FIG. 1 illustrates an exploded view of an in-cap device attached to a container for measuring material level in accordance with a preferred embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF DRAWINGS

While this technology is illustrated and described in a preferred embodiment, a device for measuring material level may be produced in different sizes, shapes and colors. This is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 illustrates an exploded view of an in-cap device 100 for measuring material level inside a container 102 in accordance with a preferred embodiment of the present invention. The in-cap device 100 communicates with a computing device. The container 102 includes a neck 103 for receiving material. In a preferred embodiment, the neck 103 is a spout. Example of material includes but not limited to water, juices, powder such as coffee, nutrient supplements etc.

The in-cap device 100 includes a cap 104, printed circuit board 106, a first sensor 108, a battery 110, a battery holder 112, a controller 114, an output unit 116, and a housing unit 118. The cap 104 is configured to receive the neck 103 of the container 102. The cap 104 includes an indent 105 for allowing the sensors to measure the material level inside the container 102.

The printed circuit board 106 is attached to the top of the cap 104 of the container 102. The first sensor 108 is placed in between the printed circuit board 106 and the indent 105 of the cap 104. The first sensor 108 measures the material level inside f the container 102 through the neck 103 of the container 102. Examples of the first sensor 108 includes but not limited to optical sensor, capacitive sensor and sonic/ultrasonic sensor.

The battery 110 is placed on the printed circuit board 106. Examples of battery 110 include but not limited to a lithium cell battery. The battery holder 112 holds the battery 110 on the printed circuit board 106. The shape and size of the battery holder 112 is configured according to the size of the battery 110.

The controller 114 is connected to the printed circuit board 106 for generating reminding signals based on the analysis of the sensed signals. Further, the controller 114 wirelessly communicates with the computing device. Examples of the controller 114 includes but not limited to a microcontroller, a microprocessor, a DSP, ASIC etc.

The output unit 116 generates output signals upon receiving reminding signals from the controller 114. Example of output unit 116 includes but not limited to an audio unit for generating audio signals on receiving reminder signals from the controller 114, one or more light emitting sources connected to illuminate on receiving reminding signals from the controller 114, and a vibration unit to produce vibration signals on receiving reminding signals from the controller 114. Examples of light emitting sources include but not limited to LED, organic lighting and florescent effect; and examples of audio unit include but not limited to speakers, buzzer, piezoelectric buzzer etc.

The housing unit 118 is connected to the cap 104 for housing the printed circuit board 106, the first sensor 108, the battery 110, the battery holder 112, the controller 114, and the output unit 116. The housing unit 118 is configured according to the shape and size of the cap 102.

In another preferred embodiment of the present invention, the in-cap device 100 further includes a wireless communication unit 120 connected to the printed circuit board 106 for wirelessly communicating with the computing device. The computing device is explained in detail in conjunction with FIG. 2 of the present invention.

The wireless communication unit 120 may use various ways of the communication technologies such as wireless technology, near field communication, sonic/ultrasonic technology, or optical technology. Examples of the wireless technology include but not limited to Bluetooth, Bluetooth smart (BLE), Li-Fi, Wi-Fi, ANT, ZigBee, or any other proprietary communication protocol/frequency (band).

Examples of near field communication includes but not limited to magnetic NFC, Radio-frequency identification (RFID). Examples of the sonic/ultrasonic technology includes but not limited to communication over sound able or non-sound able frequency. Further the optical communication technology includes but not limited to visible (i.e. blinking the LED), Non Visible (i.e. IR LED).

In another preferred embodiment of the present invention, the in-cap device 100 further includes a second sensor 122 to detect detaching and attaching of the cap 104 from the container 102 for generating a sensing signal for the controller 114. Examples of the second sensor 122 include but not limited to touch sensor, a gyro sensor, a vibration sensor, magnetic sensor, optical sensor, and an electro-mechanic sensor.

In a preferred embodiment of the present invention, the usage of the second sensor 122 is to reduce the battery consumption. The second sensor 122 controls the operation profile of the first sensor 108. Preferably, the first sensor 108 measures the material level only after detection of attaching/detaching of the cap 104 by the second sensor 122.

Further, the second sensor 122 controls the operation of the wireless communication unit 120. The controller 114 sends the signal to the wireless communication unit 120 for sending the information to the computing device only on receiving sensing signals from the second sensor 122. The wave produced from the wireless communication unit 120 is thus decreases when controlled by the second sensor 122.

In another preferred embodiment of the present invention, the in-cap device 100 further includes a third sensor 124 for measuring environmental conditions of the cap 104. Examples of third sensor 124 includes but not limited to a humidity sensor, temperature sensor, UV sensor, light sensor, accelerometer, gyro sensor, magnetic sensor, barometric sensors etc.

Figure 2:
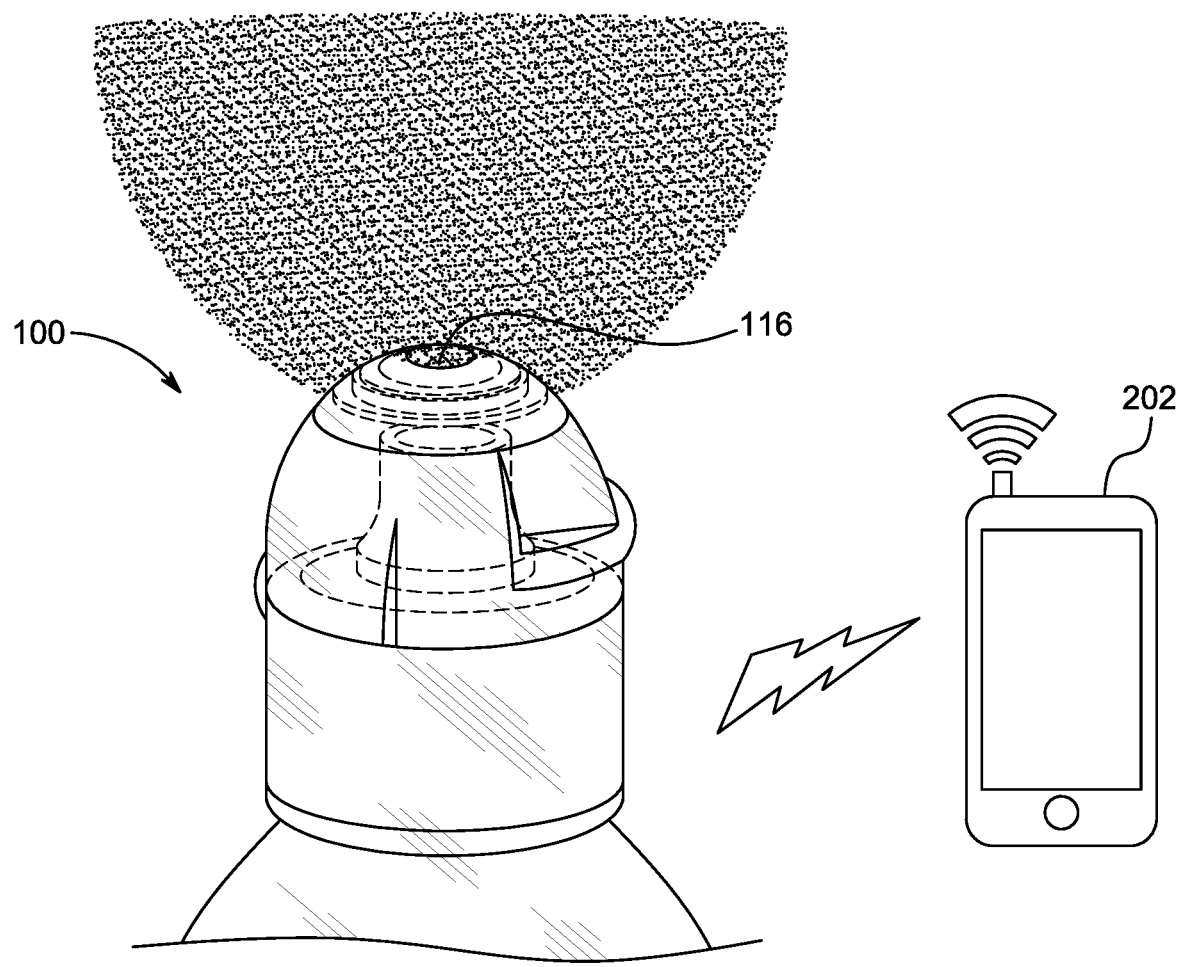
FIG. 2 illustrates a perspective view of the in-cap device in accordance with a preferred embodiment of the present invention.

FIG. 2 illustrates a perspective view of the in-cap device 100 in accordance with a preferred embodiment of the present invention. The output unit 116 is a LED and is illuminating to indicate a reminding signal for the user to drink from the container. The controller (not shown in FIG. 2) or the wireless communication unit (not shown in FIG. 2) communicates with a computing device 202.

Examples of the computing device 202 are include but not limited to mobile, smartphone, iPad, tablets, phablet, smart watch, computer, laptop, a handheld computer, a desktop, a display device or any other computing device capable of wirelessly interacting with our system.

In another preferred embodiment of the present invention, the controller (not shown in FIG. 2) receives signal from the computing device 202 for generating reminding signals. For example, the computing device 202 generates a signal to illuminate LED, therefore the signal is send to the controller and thereafter, output unit 116 acts on the reminding signal from the controller to generate output signal i.e. illumination of LED.

Figure 3:
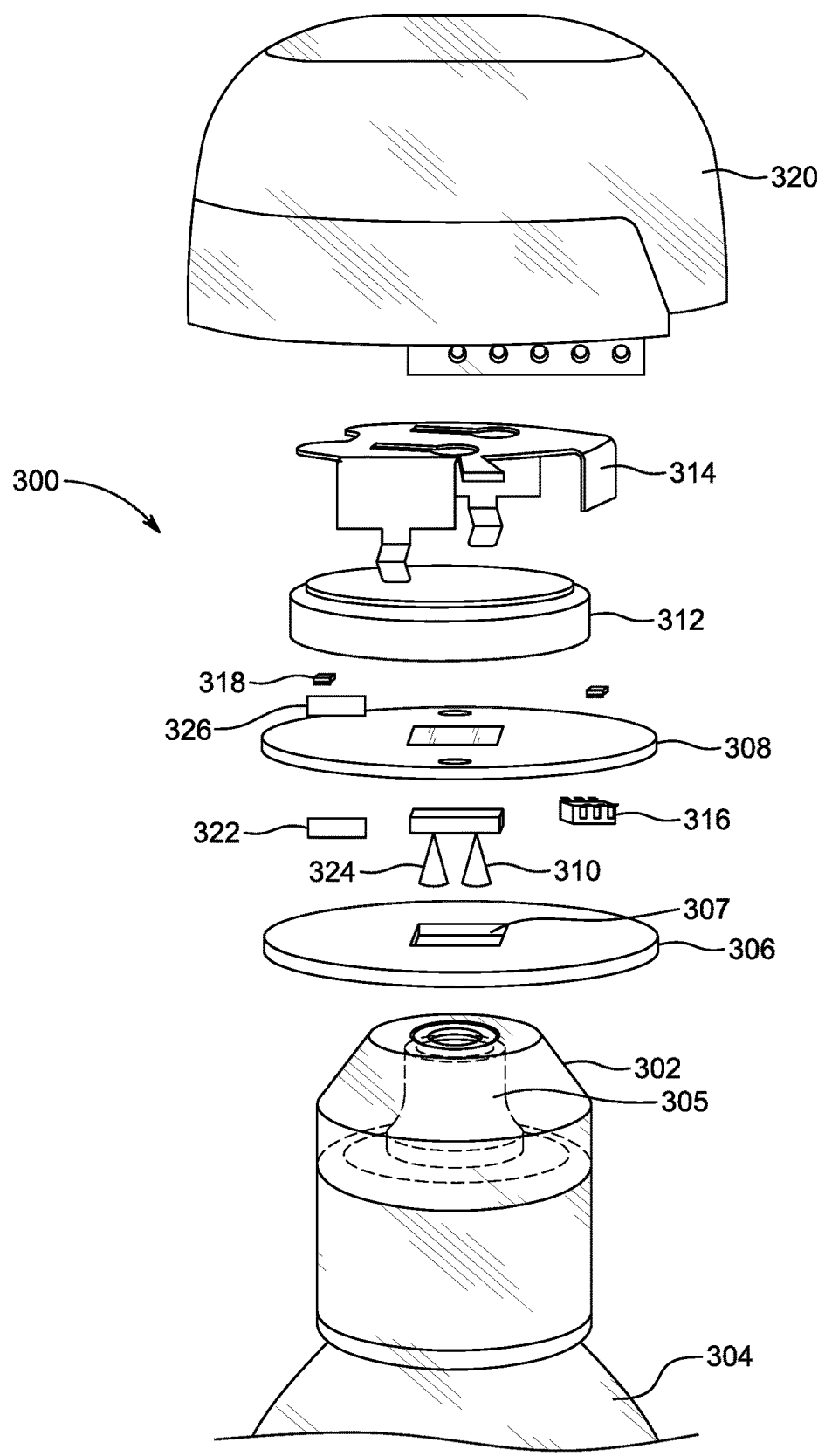
FIG. 3 illustrates an exploded view of a clip-on device clipped on a cap of a container in accordance with another preferred embodiment of the present invention.

FIG. 3 illustrates an exploded view of the clip-on device 300 in accordance with another preferred embodiment of the present invention. The clip-on device 300 is clipped on to a cap 302 of a container 304 for measuring material level and communicating with a computing device. The container 302 includes a neck 305 for receiving material.

In a preferred embodiment of the present invention, the clip-on device 300 includes a bottom cover 306, a printed circuit board 308, a first sensor 310, a battery 312, a battery holder 314, a controller 316, an output unit 318, and a housing unit 320.

The bottom cover 306 includes an indent 307 is placed on the cap 302 of the container 304. The indent 307 is aligned parallel to the neck 305. The printed circuit board 308 placed on the bottom cover 306. The first sensor 310 is disposed in the indent 307 of the bottom cover 306 and further connected to the printed circuit board 308.

The first sensor 310 measures the material level inside the container 304 and generates sensing signal based on the material level. The first sensor 310 measures the material level through the neck of the 305 of the container. The neck 305 is having an opening.

The battery 312 is placed on the printed circuit board 308, the battery holder 314 is for holding the battery 312 on the printed circuit board 308, and the controller 316 is connected to the printed circuit board 308 for generating reminding signals based on the analysis of the sensed signals. Further, the controller 316 wirelessly communicates with the computing device.

The output unit 318 generates the output signals upon receiving reminding signals from the controller 316. Examples of the output unit 318 include but not limited to an audio unit for generate audio signals, one or more light emitting sources (such as LED) for illuminating, and a vibration unit to produce vibration signals.

The housing unit 320 clipped on the cap 302 of the container 304 for housing the bottom cover 306, the printed circuit board 308, the first sensor 310, the battery 312, the battery holder 314, the controller 316 and the output unit 318. The housing unit 320 is configured according to the shape and the size of the cap 302 of the container 304. The housing unit 320 further includes a cap receiving area for receiving the cap 302 of the container 304. The cap receiving area is shown and explain in FIG. 4 of the present invention.

In another preferred embodiment of the present invention, the clip-on device 300 further includes a wireless communication unit 322 connected to the printed circuit board 308 for wirelessly communicating with the computing device. Further, the clip-on device 300 includes a second sensor 324 to detect detaching and attaching of the cap 302 from the container 304. The second sensor 324 releases sensing signal for the controller 316.

Examples of the first sensor 310 includes an optical sensor, a capacitive sensor and an ultrasonic sensor; and examples of the second sensor 324 includes but not limited to a touch sensor, a gyro sensor, a vibration sensor, a magnetic sensor, an optical sensor, and an electro-mechanic sensor. The examples of the wireless communication unit 322 are similar to the wireless communication unit 120 of the FIG. 1 of the present invention.

In another preferred embodiment of the present invention, the clip-on device 300 further includes a third sensor 326 for measuring environmental conditions of the housing unit 320. Examples of third sensor 326 includes but not limited to a humidity sensor, temperature sensor, UV sensor, light sensor, accelerometer, gyro sensor, magnetic sensor, barometric sensors etc.

Figure 4:
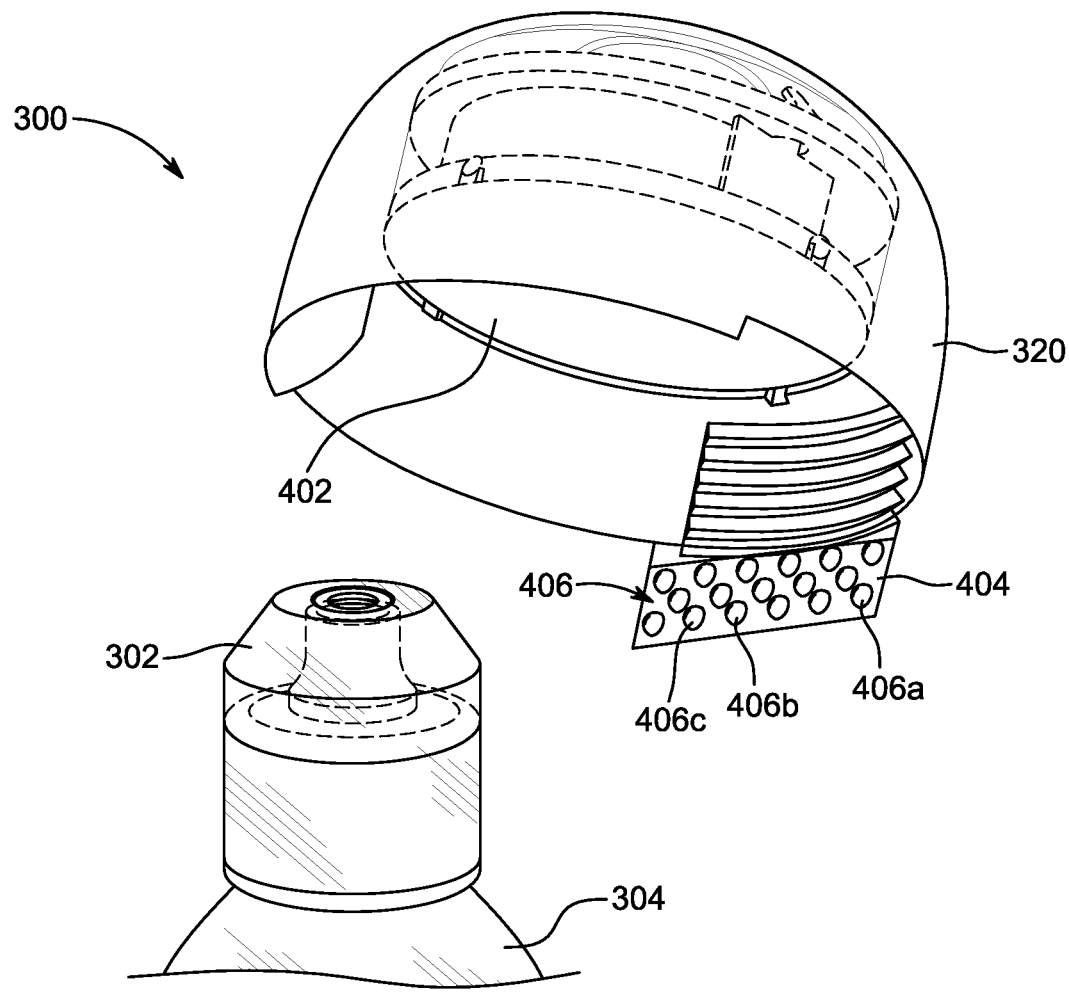
FIG. 4 illustrates a perspective view of the clip-on device detachably attached to the container in accordance with a preferred embodiment of the present invention.

FIG. 4 illustrates a perspective view of the clip-on device 300 in accordance with a preferred embodiment of the present invention. The clip-on device 300 includes a cap receiving area 402 for receiving the cap 302 of the container 304. The clip-on device 300 includes a plate 404 extending downwards from the housing unit 320 towards the cap 302 and plurality of bumpers 406 such as 406a, 406b and 406c configured on the plate 404 to fasten the housing unit 320 over the cap 302.

The present invention offers various advantages such as the amount of material being used by the user. For example, the amount of liquid consumed by the user in whole day, reminding the user to drink liquid based on the sensing of the material level inside the container. Like, if the user has drunk only 2 L since morning, then reminding the user to drink more liquid at regular interval of times. The present invention further helps in measuring powder (such as coffee, nutrient supplements) content inside a container.

The invention claimed is:

1. A device for measuring material level inside a container, the container having a cap for securely closing a mouth thereof, the device comprising:
a housing unit configured to be attached over the cap of the container, said housing unit being located above the mouth of said container when the cap is closed, said housing unit enclosing:
a bottom cover configured to be placed on the cap of the container;
a printed circuit board;
a first sensor, for measuring the material inside the container, disposed in between the printed circuit board and the bottom cover;
a battery;
a battery holder for holding the battery on the printed circuit board; and a controller connected to the printed circuit board for:
receiving a signal from the first sensor related to the material level in the container;
calculating an amount of material in the container based on the received signal; and
issuing reminding signals based on the calculated amount; and
an output unit for releasing output signals upon receiving the reminding signals from the controller,
wherein, when the housing unit is attached over the cap of the container, the device measures the material inside the container, calculates the amount of material in the container and issues reminding signals.

2. The device according to claim 1, wherein the first sensor comprises at least one of: an optical sensor; capacitive sensor; and ultrasonic sensor.

3. The device according to claim 1, wherein the output unit comprises at least one of:
an audio unit connected to the printed circuit board to generate audio signals on receiving reminder signals from the controller;
one or more light emitting sources connected to the printed circuit board to illuminate on receiving reminder signals from the controller; and
a vibration unit connected to the printed circuit board to produce vibration signals on receiving reminder signals from the controller.

4. The device according to claim 1 further comprising a wireless communication unit connected to the printed circuit board for wirelessly communicating with the computing device.

5. The device according to claim 1 further comprising a second sensor to detect detaching and attaching of the cap from the container for generating sensing signal for the controller, wherein the controller controls an operation of the first sensor only after a detection of attaching or detaching of the cap sensed by the second sensor.

6. The device according to claim 1, further comprising a third sensor for measuring environmental conditions of the cap, wherein the controller is configured to generate the reminding signals also based on the analysis of environmental conditions.

7. The device according to claim 1 further comprising:
a plate extending downwards from the housing unit towards the cap; and
a plurality of bumpers configured on the plate to fasten the housing unit over the cap.

8. The device of claim 1, further comprising:
a communication unit in communication with the controller for communicating wirelessly with an external computing device, the communication unit is enclosed in the housing unit.

9. The device of claim 1, wherein the bottom cover comprises an indent aligned parallel to the neck of the container.

10. The device of claim 1, wherein said housing unit, when attached over the cap of the container, is configured not to allow material inside the container to pass therethrough.

* * * * *